L. S. DE BIBORY.
COFFEE POT.
No. 8,939. Patented May 11, 1852.
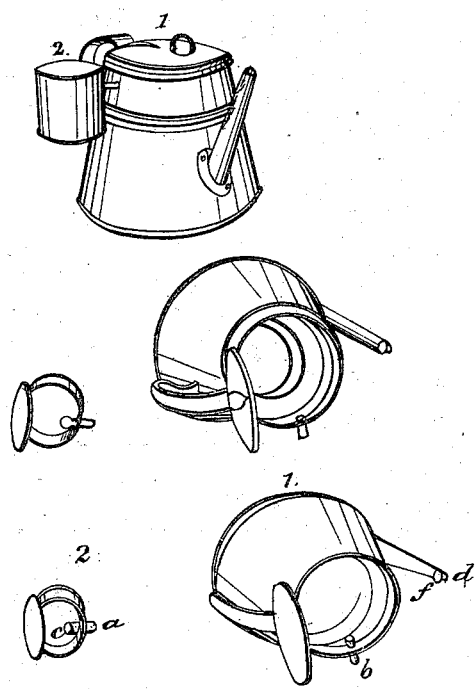

UNITED STATES PATENT OFFICE.

L. S. DE BIBORY, OF BALTIMORE, MARYLAND.

COOKING-BOILER.

Specification of Letters Patent No. 8,939, dated May 11, 1852.

*To all whom it may concern:*

Be it known that I, L. S. DE BIBORY, of Baltimore, in the State of Maryland, have invented a new and Improved Mode of Preventing Cooking Pots for Coffee, Milk, Soups, &c., from Overrunning; and I do hereby declare that the following is a full and exact description thereof, reference being had to the accompanying drawings.

The nature of my invention consists in providing the upper part of a cooking pot N. 1 with a small cup N. 2 fixing it by a small tube $a$ upon another smaller tube $b$ to the cooking pot, the fluid being raised by the heat will run into the small cup, and is saved to be poured back into the large pot, the larger tube $d$ on the cooking pot has a valve $f$ to impede the escape of the vapors.

To enable others skilled in the art to make and use my invention it is necessary besides the above description to know that the quantity of the fluid to be boiled must never reach the smaller tube $b$, it must be at least 1 inch lower than the tube $b$, so as to leave a space for raising by the heat.

What I claim as my invention, and desire to secure by Letters Patent is the application of the small cup to the cooking pot as herein described.

Washington city, February 5th, 1852.

L. S. DE BIBORY.

Witnesses:
M. S. JEROMO,
ALM. B. PATTERSON.